Dec. 2, 1924.
E. P. POWE
WAVE MOTOR
Filed Sept. 18, 1922  5 Sheets-Sheet 1
1,517,750
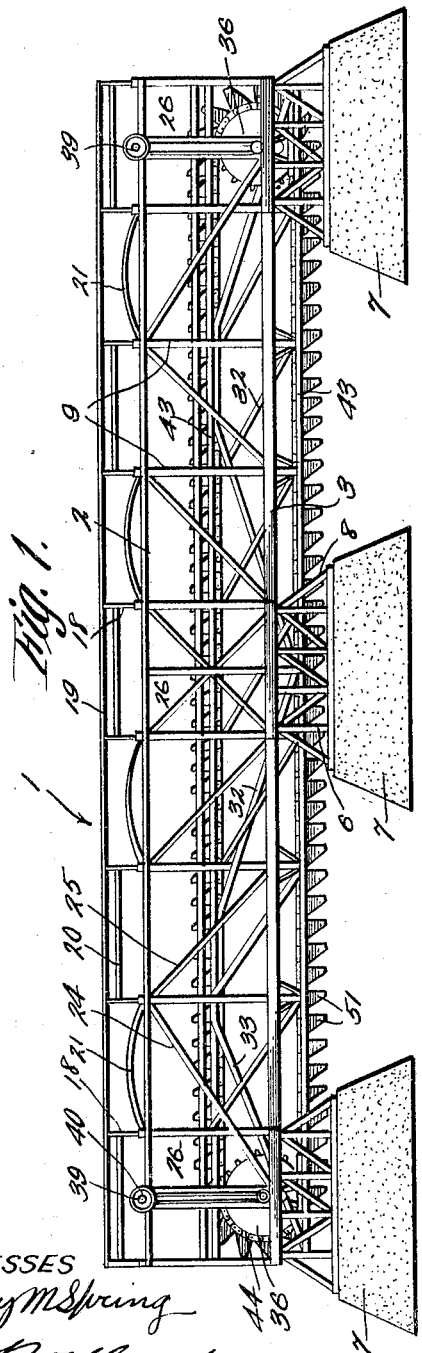
WITNESSES
EDWARD P. POWE, Inventor
By Richard B. Owen, Attorney

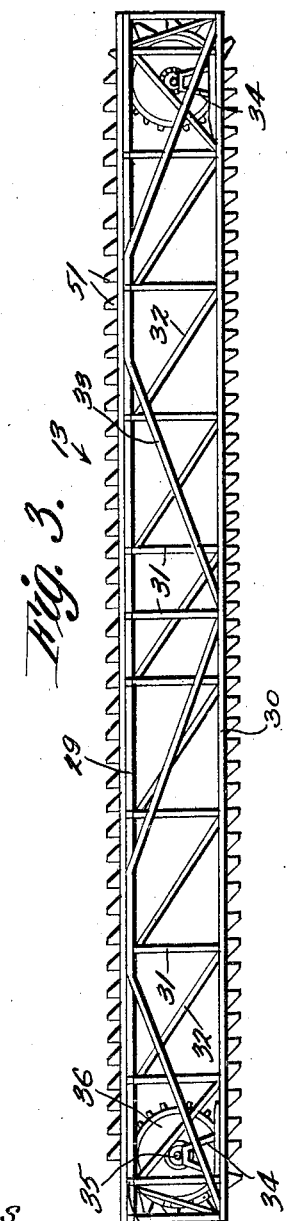
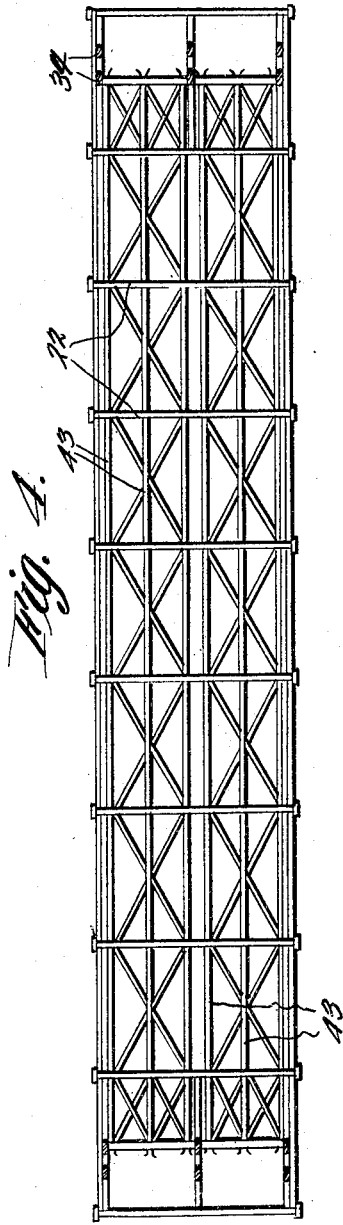

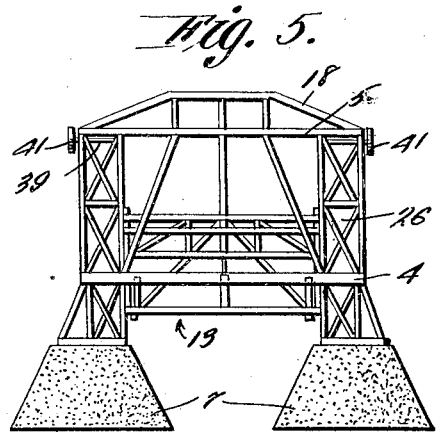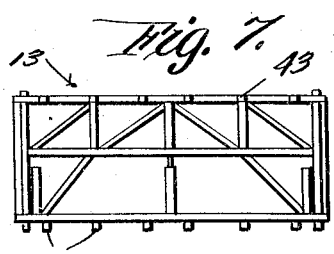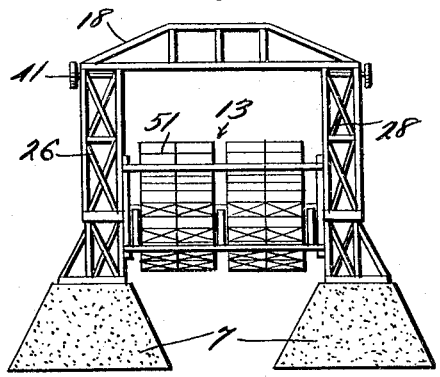

Dec. 2, 1924.
E. P. POWE
WAVE MOTOR
Filed Sept. 18, 1922     5 Sheets-Sheet 4
1,517,750
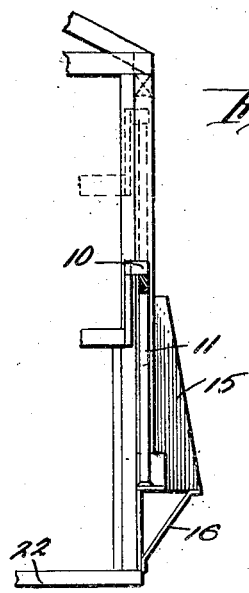
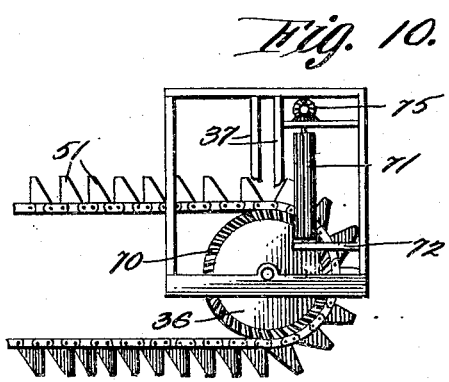
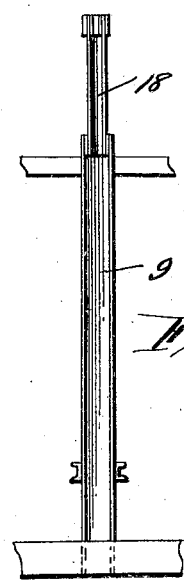
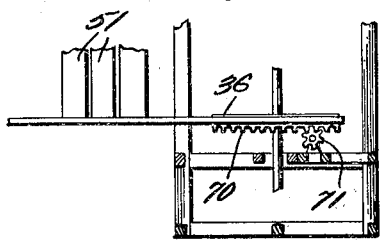
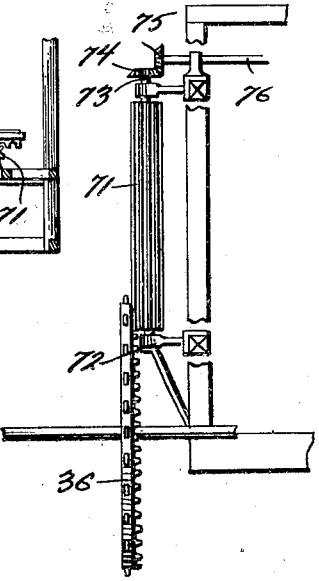
WITNESSES
Inventor
EDWARD P. POWE
Attorney Inventor
EDWARD P. POWE Patented Dec. 2, 1924.

1,517,750

UNITED STATES PATENT OFFICE.

EDWARD P. POWE, OF BERKELEY, CALIFORNIA.

WAVE MOTOR.

Application filed September 18, 1922. Serial No. 588,983.

*To all whom it may concern:*

Be it known that I, EDWARD P. POWE, a citizen of the United States, residing at Berkeley, in the county of Alameda and State of California, have invented certain new and useful Improvements in a Wave Motor, of which the following is a specification.

This invention relates to new and useful improvements in wave and current motors, the primary object of the invention being to utilize the force contained in waves and streams by an endless belt having wave or current resisting elements attached thereto and adapted to be disposed in the path of waves or a current whereby the force thereof will be exerted on the resisting element to impart movement to the endless belt whereby power may be derived therefrom.

Another important object of the invention is to provide an endless belt structure of the above mentioned character which is adjustable vertically to meet tidal conditions and for the purposes of repair et cetera, the invention also contemplating the provision of means whereby the movement of the endless belt will not be interrupted during vertical adjustment thereof.

A further object of the invention is to provide tracks or races for the runs of the endless belt and means whereby the belt will travel on the tracks or races with the least amount of friction and yet will be maintained so that the waves or current will not displace the belt from the element which it drives.

Another object of the invention resides in the provision of wave or current resistance elements for the endless belt which are designed to obtain the maximum power from the waves or current and which include a construction making their manufacture comparatively inexpensive and their functioning such as to obtain efficient service therefrom.

Other objects and advantages of the invention will become apparent during the course of the following description.

In the accompanying drawings forming a part of the description and wherein like numerals are employed to designate like parts throughout the several views:—

Figure 13:
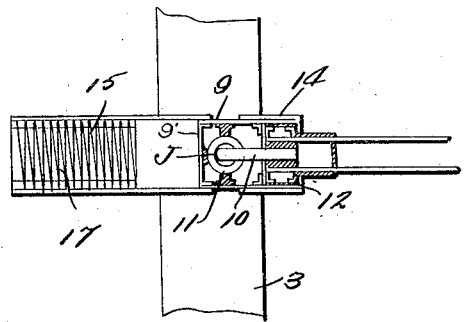
Figure 14:
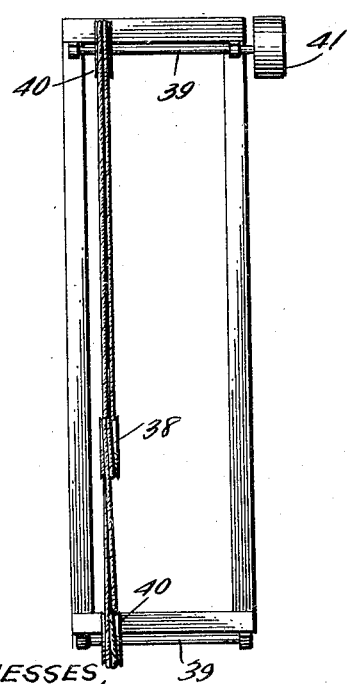

Figure 1 is a side elevation of the motor assembled but with parts not shown, whereby other parts of the invention may be viewed, Figure 2 is a top plan of the main supporting structure with the endless belts removed, Figure 3 is a side elevation of the endless belt and its supporting frame, Figure 4 is a top plan of the endless belt supporting frame with the belts removed, Figure 5 is an end elevation of the main supporting structure with the endless belt frame associated therewith, but with the endless belt omitted, Figure 6 is a similar view showing the endless belt associated with the main supporting structure, and parts of the belt supporting frame removed whereby certain other parts of the device may be clearly seen, Figure 7 is an end elevation of the endless belt supporting frame, Figure 8 is a fragmentary end elevation of a portion of the main supporting structure with a part of the endless belt supporting frame associated therewith, Figure 9 is an enlarged detail of one of the main side piers of the supporting structure, Figure 10 is an enlarged detail side elevation of one end of the endless belt showing the means for deriving power therefrom, and permitting vertical adjustment of the belts, Figure 11 is a top plan of the frame, parts of the belt supporting frame being shown in section, Figure 12 is an end elevation of the same, Figure 13 is a horizontal section through one of the main drive gears with a part of the belt supporting frame slidably associated therewith, Figure 14 is an end elevation of my preferred means for transferring power from the wave motor.

Figure 15:
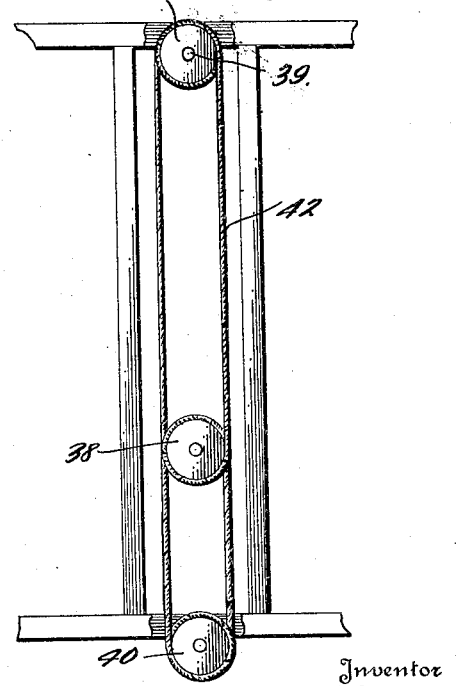

Figure 15 is a side elevation of the same.

Referring now more particularly to the drawings, wherein for the purpose of illustration I have shown the embodiments of the invention which are at present preferred, the numeral 1 designates the main supporting structure which consists essentially of an elongated arched frame consisting of a pair of horizontal top girders 2 and a pair of similarly arranged bottom girders 3. The ends of the bottom girders are connected together by cross girders 4 as clearly seen in Fig. 5, while the top girders 2 are connected at their ends by cross girders 5. The lower girders are supported in horizontal position at their ends and possibly at their central portions when necessity requires by vertical piers 6 which rise from suitable concrete or other foundations 7 and are braced by upwardly converging braces 8 or in any other suitable manner. The foundations 7 are sunk in the water to rest upon the bed thereof, and the piers 6 are of such height that the bottom girders 3 are arranged a little above high tide.

The top and bottom girders of the main supporting structure are connected together and properly supported by means of vertical main slide piers 9 which are spaced apart equal distances throughout the length of the supporting structure as shown. As clearly shown in Fig. 13, each slide pier 9 consists of a U-shaped standard 9 with its inner side open for the passage of a bracket 10 carried by a jack 11 arranged within each pier in the present instance. The bracket has its other end extended through the open side of the pier to be associated with a slide bar 12 forming a part of a belt supporting frame 13 which will be described in particular hereinafter. This slide bar 12 preferably consists of a T-shaped structure as shown, the head of which is slidably mounted between a pair of L-shaped bars 14 secured to opposite sides of each slide pier and extending inwardly of the main supporting structure where the free ends of these bars 14 are bent inwardly to extend toward each other and form a restricted slot for the passage of the stem of the T-shaped structure 12.

The piers 9 have at their outer lower sides a bracing structure 15 which, is clearly shown in Fig. 8; brackets 16 being provided to brace the extensions 14. This brace 15 consists of a pair of side plates suitably braced by angle irons extending vertically thereof, and are held spaced apart by cross braces 17 as seen in Fig. 13. It is to be understood that the jacks 11 constitute one structure as shown and cross braces 28 or ric-rak are included in each wing structure for properly bracing the same. It is to be understood that I do not limit myself to the particular arrangement of bracing of the wings or main supporting structure as shown and described as I appreciate that any other arrangement of braces, et cetera, may be resorted to as mechanical equivalents.

Referring now more particularly to Figs. 1 and 2 I have shown the endless belt supporting frame 13 associated with the main supporting structure, and in Fig. 3 I have illustrated the same disassembled from the supporting structure. The endless belt supporting frame 13 is substantially rectangular in cross section as clearly shown in Fig. 7 and is adapted to be positioned lengthwise between the vertical sides of the arched supporting structure 1 to be slidably associated therewith. The belt supporting frame in the present instance makes provision for a pair of endless belts running side by side but it is to be understood that I do not limit the invention to the use of any particular number of endless belts for one or more belts may be used as occasion requires. When it is desired to use more than two endless belts, another foundation 7 is sunk alongside of the main supporting structure and consists of the equivalent of one side of the main supporting structure so that a second pair of endless belts can be arranged between the original supporting structure and the newly erected structure.

The endless belt frame 13 consists of upper and lower parallel spaced girders 29 and 30 which are connected together by a plurality of slide piers 31 which in number may be equal to the main slide piers 9 of the main supporting structure, or there may be as many as is found necessary in practice. As explained hereinbefore, each slide pier 31 is equipped with a T-shaped head 12 which slide in the main slide girders 9 as clearly shown in Fig. 13. In this manner, it will be seen that the endless belt supporting frame 13 is movable vertically of the main supporting structure for adjusting the belt carrying frame 13 vertically, and that I do not limit myself to the use of such jacks, as other means such as chain blocks, screws, etc., may be substituted for the jacks.

Mounted on top of each side pier 9 is a vertical standard 18, the upper ends of said standards each side of the supporting structure being connected together by means of girders 19. Straight trusses 20 alternate with arched trusses 21 in connection with the upright 18 and the slide piers 9 of the main supporting structure as best seen in Fig. 1. The standards 18 incline upwardly toward the center of the main supporting structure as seen in Fig. 5 to provide the top of the structure with an arched top. The top girders 2 are connected at spaced intervals by transversely extending braces 22 and between each pair of braces is arranged a pair of cross trusses 23 which have their ends connected to adjacent top girders 2. The top girders 2 at each side of the supporting structure are further supported at each side by a main inverted U-shaped brace 24, the free ends of the arms of which are connected to the bottom girders 3 adjacent their ends as clearly shown in Fig. 1. Additional braces 25 extend diagonally from one slide pier 9 to the other.

At each side of the main supporting structure adjacent its end, I provide a laterally extending wing structure, and if occasion requires, a similar wing structure 27 may be attached to either side of the main supporting structure at its medial portion as clearly shown in Figs. 1 and 2. Each wing structure consists of a rectangular structure arranged with its longitudinal dimensions extending parallel to the longitudinal dimensions of the main supporting structure 1. The wing structure extends from the bottom girder to the top girder of the main supporting structure so as to be arranged in proper position according to the tide. Diagonal braces 32 connect each pair of slide piers 31, and inverted U-shaped braces 33 connect the top and bottom girders of the belt supporting frame as clearly shown. Each end of the belt supporting frame is provided with a shaft stand or bearing 34 in which is journalled a shaft 35. On each shaft at each end of the belt supporting structure is keyed one or more pairs of sprocket wheels 36, depending upon how many endless belts are used.

The ends of each shaft 35 are extended and are adapted to pass between a pair of upright spaced twin piers 37 mounted at the inner side of each end wing structure 26. Each extended end of the shafts which project into its respective wing structure 26 is provided with a double grooved sheaved wheel 38 as clearly seen in Figs. 14 and 15. A counter shaft 39 is mounted transversely with the top and bottom of each wing structure 26 in vertical alignment with the extended ends of the shafts 35 of the sprocket wheels, it being noted that the lower counter shafts 39 are mounted below the extended ends of the sprocket wheel shaft 35. Each counter shaft has keyed thereto a double grooved pulley 40 and a pulley wheel 41 is mounted on each upper shaft 39. A belt or cable 42 is wound one and one-half times around each pulley wheel 40 and once around the sheave wheel 38 so that the movement of the sheave wheels 38 caused by movement of the belt frame will not interfere with the continuance of the cables 42 in transmitting power from the device. It will therefore be obvious that the endless belt supporting frame will be self adjustable vertically to meet the movement of the waves.

The top and bottom of the endless belt supporting frame is provided with a plurality of tracks or races 43 which are shown in cross section or detail in Figs. 19 and 22.

I have provided for transferring power from the motor to any desirable place for the generation of electrical energy, or for any other purpose found desirable, and I provide the outer face of one or more of the sprocket wheels 36 with beveled gear teeth 70 as best seen in Figs. 10, 11 and 12. For each of these sprocket wheels which is provided with the spiral teeth I provide a vertically disposed worm spool 71 adjacent the sprocket wheel and mount it in vertical bearings 72 as shown, to one side of the shafts of the sprocket wheels. The upper end of the worm spool 71 is provided with an axial extension 73 which carries a beveled gear 74 adapted for mesh with a corresponding gear 75 keyed to a shaft 76 extending transversely of the endless belt carrying frame 13. Due to this arrangement, it will be seen that when the lower run of the endless belts are disposed in a current, or to receive the impact of waves before they break, that the endless chains will be moved, thereby imparting rotary movement to the sprocket wheels 36 and corresponding movement to the worm spools 71 and thence to the shaft 76 which may convey power to any suitable point. Whenever the endless belt carrying frame 13 changes its position vertically it will be seen that the sprockets 36 can readily move vertically along the worm spools 71 without interfering with the transformation of power from the endless belt to the shaft 76.

From the foregoing description it will be seen that the endless belts together with the buckets and the carrying frame 13 can be adjusted vertically to properly dispose the buckets in the current regardless of the height of the tide, since the motor is designed so that the endless belt carrying frame 13 can be adjusted vertically about twelve feet whereby the same can be moved to a position above high tide for repair or to throw the motor out of operation. Counter weights may be associated with endless belt supporting frame to assist in lifting the endless belt supporting frame to the desired elevation.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim is:—

1. A water motor comprising a supporting structure, a power receiving element including a vertically disposed elongated pinion rigidly carried by the supporting structure, an endless belt frame adjustable vertically in said supporting structure, an endless belt rotatable in said frame and adapted to operate a power conveying element having gear teeth to mesh with said elongated pinion, whereby upon vertical movement of the endless belt frame, the power conveying element will automatically adjust itself on the elongated pinion of the power receiving element.

2. A water motor comprising a main supporting structure including a plurality of vertically extending piers, jack members mounted in said piers, a belt supporting frame adjustably mounted in said supporting structure, bars carried by the belt supporting frame and slidably mounted in said piers, brackets extending from said bars and engaging said jack members whereby said belt supporting frame is adjustably supported by said jack members.

3. A water motor comprising a supporting structure, power receiving pulley wheels mounted at the upper and lower ends of said supporting structure, an endless belt frame adjustable vertically in said supporting structure, an endless belt rotatable in said frame and adapted to operate power conveying pulleys, said power conveying pulleys adapted to be positioned between said power receiving pulley wheels and flexible means trained around said power conveying pulleys and power receiving pulley wheels whereby upon vertical adjustment of the endless belt, the power conveying pulleys will automatically adjust itself with relation to the power receiving pulley wheels.

In testimony whereof I affix my signature in presence of two witnesses.

EDWARD P. POWE.

Witnesses:
E. J. CURRAN,
H. BARCKLAY.